(12) United States Patent
Wu et al.

(10) Patent No.: US 7,168,180 B2
(45) Date of Patent: Jan. 30, 2007

(54) SELF-POWERED ROTARY OPTICAL ALIGNING APPARATUS

(76) Inventors: Chyi-Yiing Wu, 3 Fl., No. 48, Shih-Ping Street, Taipei (TW); Ming-Chun Hu, 4-2 Fl., No. 21, Nanking East Road, Sec. 4, Taipei (TW)

(*) Notice: Subject to any disclaimer, the term of this patent is extended or adjusted under 35 U.S.C. 154(b) by 364 days.

(21) Appl. No.: 10/816,541

(22) Filed: Mar. 31, 2004

(65) Prior Publication Data

US 2004/0194600 A1   Oct. 7, 2004

(30) Foreign Application Priority Data

Apr. 1, 2003   (TW) .............................. 92205127 U

(51) Int. Cl.
*B23Q 17/22* (2006.01)
*B26D 7/00* (2006.01)
(52) U.S. Cl. ..................... 33/642; 33/640; 33/DIG. 21; 83/520; 362/192
(58) Field of Classification Search ................ 33/286, 33/645, 333, 626, 628, 630, 640, 641, 642, 33/DIG. 21, DIG. 1; 83/520, 521, 522.15, 83/522.16, 522.17, 522.22, 522.23, 522.24, 83/522.26, 665, 666; 30/390, 392; 310/113; 362/192
See application file for complete search history.

(56) References Cited

U.S. PATENT DOCUMENTS

| | | | | |
|---|---|---|---|---|
| 3,548,185 A | * | 12/1970 | Hall | .......................... 362/192 |
| 5,862,727 A | * | 1/1999 | Kelly | ............................ 83/13 |
| 6,035,757 A | * | 3/2000 | Caluori et al. | ................ 83/520 |
| 6,497,168 B1 | * | 12/2002 | Levine | ........................ 83/520 |
| 6,584,695 B1 | * | 7/2003 | Chang | ........................ 30/391 |
| 6,755,107 B2 | * | 6/2004 | Peot et al. | ..................... 83/478 |
| 2003/0140758 A1 | * | 7/2003 | Weusthof et al. | ............. 83/490 |
| 2003/0165063 A1 | * | 9/2003 | Liaw | ......................... 362/500 |
| 2004/0042206 A1 | * | 3/2004 | Luo | ........................... 362/192 |
| 2004/0083869 A1 | * | 5/2004 | Aziz et al. | .................... 83/520 |
| 2004/0194600 A1 | * | 10/2004 | Wu et al. | ...................... 83/520 |
| 2005/0011325 A1 | * | 1/2005 | Caluori | ....................... 83/520 |
| 2005/0098011 A1 | * | 5/2005 | Kao et al. | ..................... 83/490 |
| 2005/0193881 A1 | * | 9/2005 | Liao et al. | .................... 83/478 |
| 2005/0280322 A1 | * | 12/2005 | Tsou | ........................ 310/67 R |

FOREIGN PATENT DOCUMENTS

DE     10301440 A1 *  8/2004
DE   1004033576 A1 *  2/2006

* cited by examiner

*Primary Examiner*—R. Alexander Smith

(57) ABSTRACT

An optical aligning apparatus includes: a pendulum disk having a laser illuminator mounted in a lower portion of the pendulum disk, a multiple-pole magnet annularly formed on a collar concentrically secured on a shaft of a rotary machine, an electromagnetic coil device secured in the pendulum disk and rotatably disposed around the multiple-pole magnet formed on the collar; whereby upon rotation of the rotary machine to simultaneously rotate the magnet on the collar secured on the shaft relative to the electromagnetic coil device on the pendulum disk which is gravitationally pendent and stationary, the electromagnetic coil will be electromagnetically induced to produce electricity to power the laser illuminator for projecting a laser optical line to an object for alignment or marking in order to be processed by the rotary machine.

5 Claims, 3 Drawing Sheets

SELF-POWERED ROTARY OPTICAL ALIGNING APPARATUS

BACKGROUND OF THE INVENTION

U.S. Pat. No. 6,035,757 to Raymond Caluori disclosed a rotary saw cut alignment device including a battery power source carried by a cutting unit, and a beam light source, operatively connected to the power source, and carried by the cutting unit, wherein the light source projects a light beam from the cutting unit directed along the cutting edge of a blade to assist the operator in cutting accurately.

However, this prior art has the following drawbacks:

1. A plurality of batteries (16) and the laser diode assembly (14) should be homogeneously distributed on the circular housing (12) to increase the design and production complexity thereof. If the batteries (16) are not well arranged on the circular housing, unbalance rotation of the equipment will be caused to possibly influence a precision cutting operation.
2. The batteries should be always replaced with new one or should be recharged for keeping enough electric energy for normally operating the equipment, causing inconvenience for the operator.
3. Since the blade is continuously rotated when cutting an article, the vibration caused during the cutting operation may easily loosen the electrical contacts including the contacts between the laser driving circuit and the batteries, thereby possibly disrupting the cutting operation.

The present inventor has found the drawbacks of the conventional cut alignment device and invented the present optical aligning apparatus.

SUMMARY OF THE INVENTION

The object of the present invention is to provide an optical aligning apparatus including: a pendulum disk having a laser illuminator mounted in a lower portion of the pendulum disk, a multiple-pole magnet annularly formed on a collar concentrically secured on a shaft of a rotary machine, an electromagnetic coil device secured in the pendulum disk and rotatably disposed around the multiple-pole magnet formed on the collar; whereby upon rotation of the rotary machine to simultaneously rotate the magnet on the collar secured on the shaft relative to the electromagnetic coil device on the pendulum disk which is gravitationally pendent and stationary, the electromagnetic coil will be electromagnetically induced to produce electricity to power the laser illuminator for projecting a laser optical line to an object for alignment or marking in order to be processed by the rotary machine.

DETAILED DESCRIPTION

Figure 1:
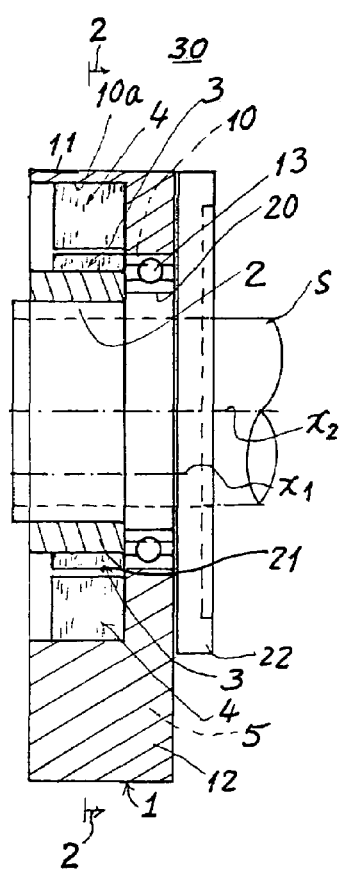
FIG. 1 is a sectional drawing of the present invention.
Figure 2:
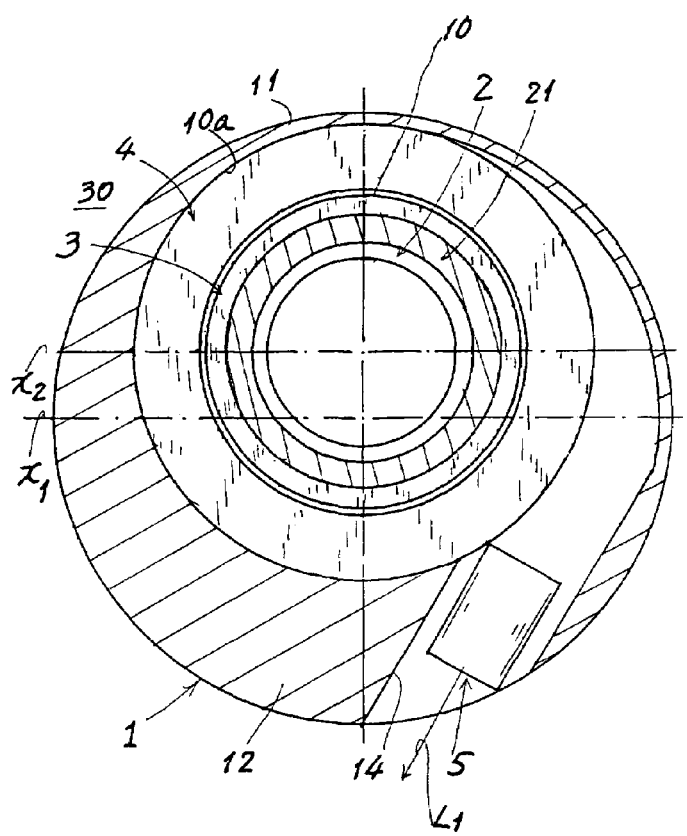
FIG. 2 is a cross sectional drawing as viewed from Line 2—2 of FIG. 1.
Figure 3:
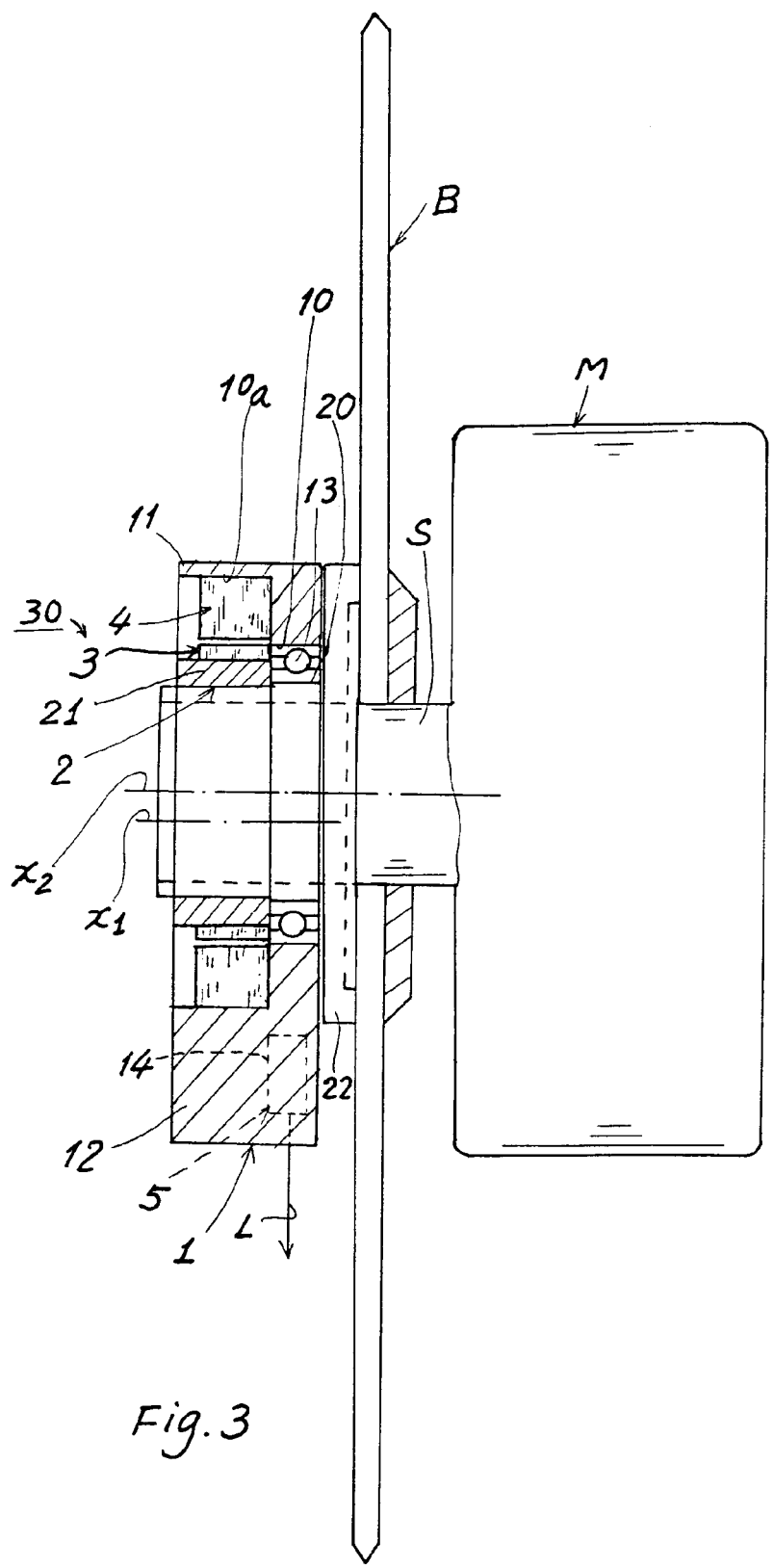
FIG. 3 is an illustration of the present invention when provided for a rotary saw.

As shown in FIGS. 1~3, an optical aligning apparatus of the present invention comprises: a pendulum disk 1; a sleeve 2 annularly secured on a shaft S of a driving motor M of a rotary machine such as a rotary saw B (FIG. 3); a power generator 30 including a multiple-pole magnet 3 concentrically formed on a collar 21 of the sleeve 2, and an electromagnetic coil 4 secured in the pendulum disk 1 and annularly rotatably disposed around the magnet 3; and an optical illuminator 5 mounted in a lower portion of the pendulum disk 1 and electrically connected to and powered by the power generator 30 when rotated for projecting an optical line to an object for alignment or marking purpose. The disk 1 is stationarily pendently hanged on the sleeve 2 and the shaft S.

The pendulum disk 1 includes: a disk center $X_1$ which is eccentric to a shaft axis $X_2$ of the shaft S of the driving motor M and the disk center $X_1$ is positioned below the shaft axis $X_2$ (FIG. 2), a circular hole 10 eccentrically formed in an upper portion of the pendulum disk 1 and having a bearing 13 formed in a base portion of the disk 1 along a perimeter of the circular hole 10 for rotatably engaging the sleeve 2 especially for rotatably engaging a sleeve neck portion 20 (adjacent to the collar 21) of the sleeve 2 having the neck portion 20 annularly secured on the shaft S, a gravity center (not shown) of the pendulum disk 1 formed in a lower portion of the pendulum disk 1 below the shaft axis $X_2$; wherein the multiple-pole magnet 3 is concentrically formed on the collar 21 of the sleeve 2 and simultaneously rotating with the rotation of the shaft S to render as a "rotor" to be rotatably engaged in the electromagnetic coil 4, which is concentrically disposed around the magnet 3 and is secured in an annular recess 10a radially enlarged from the circular hole 10 in the pendulum disk 1 which is gravitationally pendent and stationary to allow the electromagnetic coil 4 to serve as a "stator" relative to the "rotor" of the magnet 3. The center $X_2$ of circular hole 10 is aligned with the shaft axis $X_2$ of the shaft S.

Upon rotation of the shaft S to rotate the magnet 3 serving as a rotor, a current will be induced electromagnetically by the electromagnetic coil 4 serving as a stator as concentrically disposed about the magnet 3 to power the optical illuminator 5 which is electrically connected to the electromagnetic coil 4 by electric wires (not shown) as embedded or formed in the disk 1.

As shown in FIG. 3, a blade B of a rotary saw is secured to a flange 22 circumferentially formed on the sleeve 2; whereby upon rotation of the shaft S as driven by the motor M to produce current by the power generator 30 of the present invention, the illuminator 5 provided in a chamber 14 in the disk 1 will be powered by the current from the power generator 30 to project an optical line L aiming at a cutting line (not shown) on an object to be cut by the blade B of the rotary saw.

The present invention may also be utilized in other rotary machines, not limited in this invention.

The disk 1 and all other elements are preferably formed as circular or cylindrical shape to form a compact unit for enhancing smooth operation and ornamental effect.

The optical illuminator 5 may be a laser illuminator, which includes a laser module having a laser diode connected with a rectifying circuit electrically connected to the power generator 30, and a lens such as a cylindrical-surfaced lens in front of the laser diode for projecting a laser optical line for alignment or marking purpose.

As shown in FIG. 2, the optical illuminator 5 is mounted in a chamber 14 inclinedly formed in a lower portion of the pendulum disk 1 for projecting an optical line $L_1$ downwardly to an object to be mechanically processed.

Figure 4:
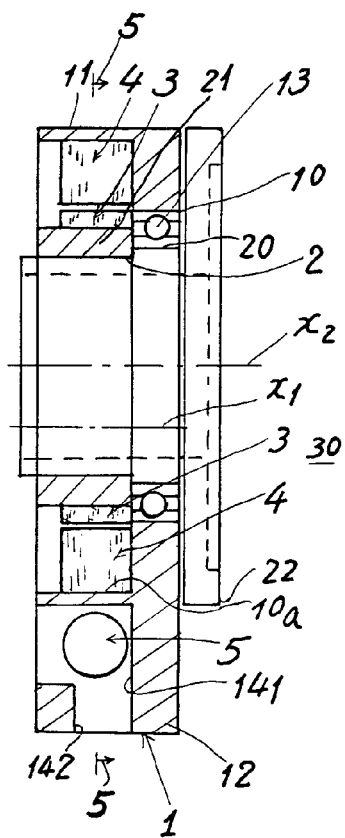
FIG. 4 is a sectional drawing of another preferred embodiment of the present invention.
Figure 5:
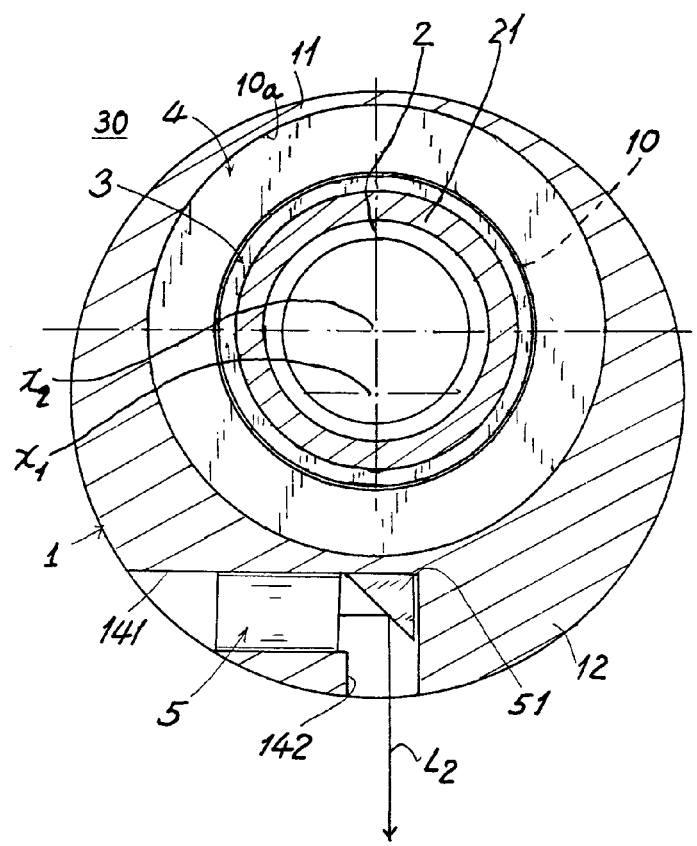
FIG. 5 is a cross sectional drawing when viewed from Line 5—5 of FIG. 4.

As shown in FIGS. 4, 5, a laser illuminator 5 may be horizontally mounted in a horizontal chamber 141 formed in a lower portion of the pendulum disk 1, a prism 51 formed in front of the laser illuminator to reflect the laser optical line as projected from the laser illuminator 5 downwardly ($L_2$) through a radial slot 142 in the disk to be projected downwardly to an object. The prism 51 may reflect the laser optical line precisely to the object to be aligned.

The optical line $L_1$, $L_2$ as projected from the illuminator 5 shall be well oriented to an object to form an alignment line, along which the tool of a rotary machine (such as the blade B of a rotary saw) may be precisely processed (or cut) thereto.

The pendulum disk 1 may be made with metal, alloy or suitable materials by molding or casting process to be gravitationally pendent to provide a stator for the power generator 30 even under high-speed revolution of the rotary machine. The bearing 13 in between the circular hole 10 of the disk 1 and the sleeve 2 on the shaft S provides a rotational relationship therebetween, thereby ensuring a smooth rotation relationship between the magnet 3 and the electromagnetic coil 4.

The present invention is superior to the prior art because the power for energizing the illuminator 5 is directly supplied from the power generator 30 formed in situ in the disk 1, without being additionally carried with batteries. Accordingly, the present invention provides a compact self-powered rotary optical aligning instrument for a convenient alignment or marking use.

The present invention may be modified without departing from the spirit and scope of the present invention.

We claim:

1. A rotary optical aligning apparatus comprising:
   a pendulum disk;
   an optical illuminator mounted in a lower portion of said disk;
   a sleeve adapted to be secured on a shaft of a driving motor of a rotary machine; with said pendulum disk stationarily pendently hanged on said sleeve on said shaft;
   a magnet annularly secured on the sleeve to be simultaneously rotated with the rotation of the shaft; and
   an electromagnetic coil formed in an upper portion of the said pendulum disk, and concentrically disposed around said magnet for rotatably engaging said magnet within said electromagnetic coil; said electromagnetic coil electrically connected to said illuminator; whereby upon rotation of said shaft and said magnet, said electromagnetic coil will be electromagnetically induced to produce electricity to power said illuminator for projecting an optical line to an object for alignment or marking to be processed by the rotary machine.

2. An apparatus according to claim 1, wherein said pendulum disk includes: a disk center ($X_1$) which is eccentric to a shaft axis ($X_2$) of the shaft of the driving motor and the disk center ($X_1$) is positioned below the shaft axis ($X_2$), a circular hole eccentrically formed in an upper portion of the pendulum disk and having a bearing formed in a base portion of the disk along a perimeter of the circular hole for rotatably engaging a sleeve neck portion adjacent to the collar of the sleeve having the sleeve neck portion annularly secured on the shaft, a gravity center of the pendulum disk formed in a lower portion of the pendulum disk below the shaft axis ($X_2$); wherein the magnet is concentrically formed on the collar of the sleeve and simultaneously rotating with the rotation of the shaft to render as a rotor to be rotatably engaged in the electromagnetic coil, which is concentrically disposed around the magnet and is secured in an annular recess radially enlarged from the circular hole in the pendulum disk which is gravitationally pendent and stationary to allow the electromagnetic coil to serve as a stator relative to the rotor of the magnet; a center of the circular hole being aligned with the shaft axis ($X_2$) of the shaft.

3. An apparatus according to claim 1, wherein said optical illuminator is mounted in a chamber inclinedly formed in the lower portion of the pendulum disk for projecting an optical line downwardly to an object to be mechanically processed.

4. An apparatus according to claim 1, wherein said illuminator is horizontally mounted in a horizontal chamber formed in the lower portion of the pendulum disk, a prism formed in front of the illuminator to reflect an optical line as projected from the illuminator downwardly through a radial slot in the disk to be projected downwardly to an object.

5. An apparatus according to claim 1, wherein said illuminator is a laser illuminator.

* * * * *